July 9, 1935.    J. E. DORAN ET AL    2,007,180
DEVICE FOR MOVING A MACHINE MEMBER OR OTHER PART, BY POWER
MEANS, AN EXACT DISTANCE OR TO AN EXACT POSITION
Filed May 7, 1934    5 Sheets-Sheet 1

INVENTOR.
John E. Doran
John M. Walter
Forrest E. Cardullo
BY
ATTORNEY.

Patented July 9, 1935

2,007,180

UNITED STATES PATENT OFFICE 2,007,180

DEVICE FOR MOVING A MACHINE MEMBER OR OTHER PART, BY POWER MEANS, AN EXACT DISTANCE OR TO AN EXACT POSITION

John E. Doran, John M. Walter, and Forrest E. Cardullo, Cincinnati, Ohio, assignors to The G. A. Gray Company, Cincinnati, Ohio Application May 7, 1934, Serial No. 724,304

18 Claims. (Cl. 90—16)

The purpose of our invention is to provide power means for moving a heavy machine member, such as the table of a planer-type milling machine, or of a jig borer, or the head of a planer-type milling machine or jig borer, to any particular point in its travel, or to move it any desired distance (within a fraction of a thousandth of an inch) from one point to another point in its line of travel without the necessity of providing a mechanical stop against which the moveable member is forced.

Hitherto, it has been necessary in order to exactly position a machine member either to push it forcibly against a fixed or adjustable mechanical stop, which is inaccurate at best and harmful to the mechanism, or else to move it into place by means of a hand crank and screw, or some other manually operated mechanism, which is a slow, and in the case of a heavy part of a large machine, a laborious operation. We avoid this by using power means for moving the member and direct acting control means for finally stopping the power means at precisely the right point. In order to expedite a movement of any considerable distance, we employ two power means, one of which is adapted to move the element rapidly, and the other of which is adapted to move the element slowly and precisely. In order that the moveable member shall stop at the desired point, we provide means, consisting of a part of the moveable member itself, or of a part attached thereto, which touches and moves a moveable control element which actuates control apparatus located on the part on which the member moves or slides, which slows down and stops the motor or motors which move the moveable member, after the moveable control element has been moved by a certain definite amount, or in a certain definite time after the control means or some part of it has been actuated.

Alternatively, the control means may be attached to the moveable member and the projection actuating the control means may be a part of or attached to the fixed member of the machine.

In order to measure a precise distance, we make use of an apparatus consisting of an index slide adapted to be moved in a guide or carrier, which may be attached to, or form part of either the moveable or the fixed member. In a part of this guide, we machine holes of identical diameter having exact distances apart, preferably 1" from center to center. A plunger in the index slide of such a size as to just enter the hole may be inserted in any one of the holes, whereby the index slide may be moved any desired integral number of inches with great exactness. To the index slide may be attached a micrometer head, the anvil of which is adapted to actuate the control means by contact. Alternatively, the micrometer head may be attached to the moveable control element, which will then be moved by contact between the anvil of the micrometer head and a projection on the index slide, or the micrometer, the moveable control element, and the control means may slide on the guide or carrier, the control means being actuated by contact between a projection on the fixed or moveable member and the micrometer anvil. By this means, the actuation of the control means may be readily caused to occur at any position of the moveable element, and having occurred it may be caused to occur again at any position at any desired distance from the first, thus moving the moveable element by any desired exact distance.

Furthermore, in order to eliminate any possibility of error, we embody in the control apparatus what is known as a dial indicator, having a revolving hand which indicates thousandths of an inch movement. In use the dial indicator is adjusted so that the hand points to zero when the control apparatus has stopped the moveable member, and any deviation from the zero after any subsequent movement and stoppage of the moveable member indicates the amount of inaccuracy, which may be corrected by backing off the moveable member and again moving it into position until the control means stops it with the hand pointing to zero, or by making compensation for the amount of error indicated by the dial indicator. When the moveable member is correctly stopped by the control means it is said to be in index position.

In the drawings, Fig. 10 is an end view of the control box 6 and of the bracket on which it slides. The greater part of Fig. 9 is a section on the line 9—9 of Fig. 10, while the upper right hand portion is broken away to show a section on line 9a—9a of Fig. 10 in order to explain the adjusting mechanism by which box 6 is moved.

In all of the simplified diagrams the contacts are represented in the position which they have when the entire circuit is deenergized and the switches are represented in the position which they have when the moveable control element is not touched. The contacts in the description are stated to be normally open if they are open when the coil of the solenoid which actuates them is deenergized. Such contacts are closed by the movement of the solenoid when the coil is energized.

Contacts which are stated to be normally closed are closed when the coil of the solenoid which actuates them is deenergized and such contacts are opened by the movement of the solenoid when the coil is energized. After the coil of any solenoid is deenergized, a spring or weight returns the contacts to their normal condition, in the manner usual in the art, unless a member specifically described, prevents such action.

Figures 1, 11, 12, 15, 16:
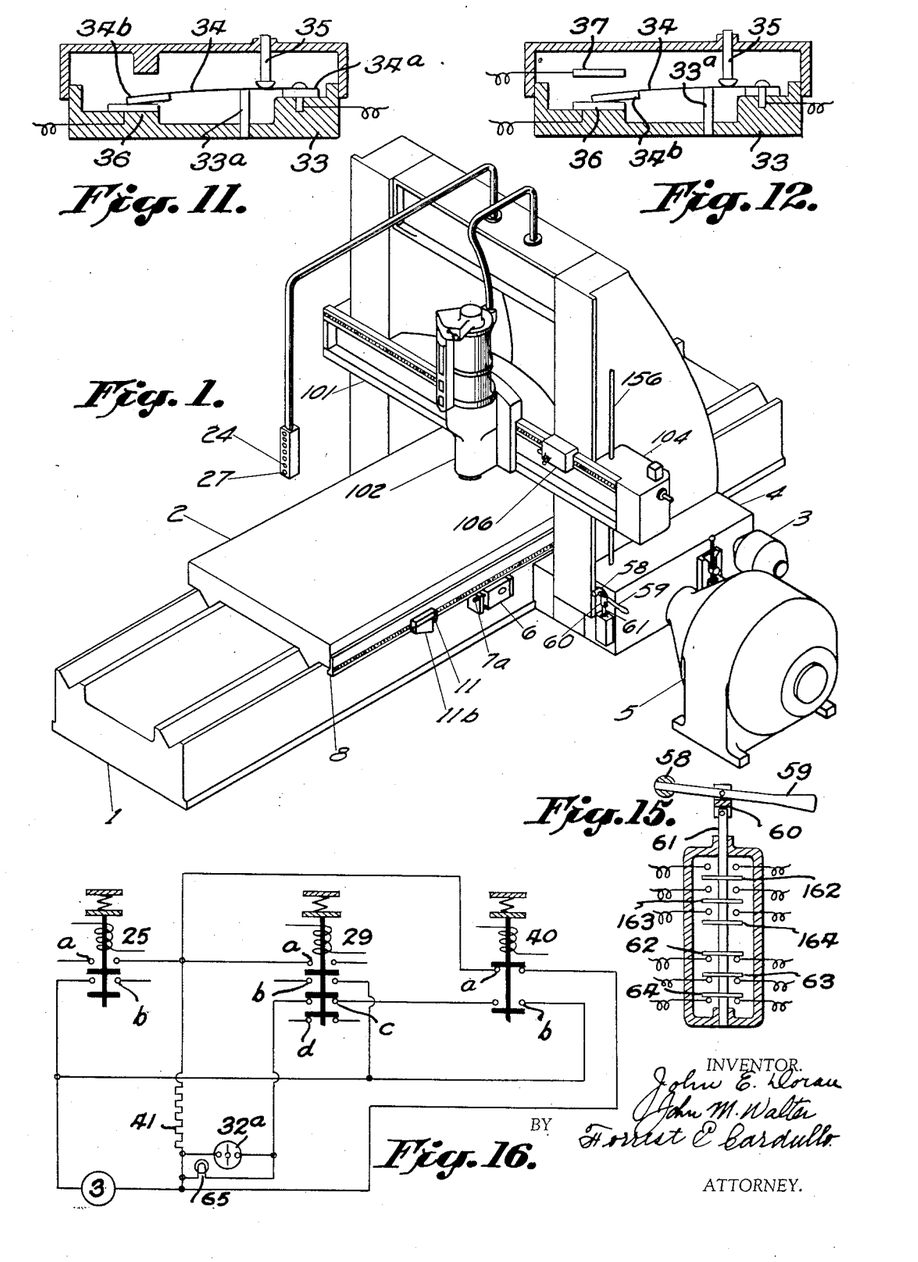
Fig. 1 is an isometric projection of a planer-type milling machine having one head on the rail.
Fig. 11 is a diagrammatic sectional drawing of a single throw close motion switch of a type which we employ.
Fig. 12 is a diagrammatic sectional drawing of a double throw close motion switch of a type which we employ.
Fig. 15 is a diagrammatic representation of switches actuated by a control handle 59 which also actuates clutch means alternatively to connect the motors 3 and 5 with the table moving mechanism or the head moving mechanism.
Fig. 16 is a simplified circuit diagram showing an alternative method for stopping the positioning motor 3.
Figure 2:
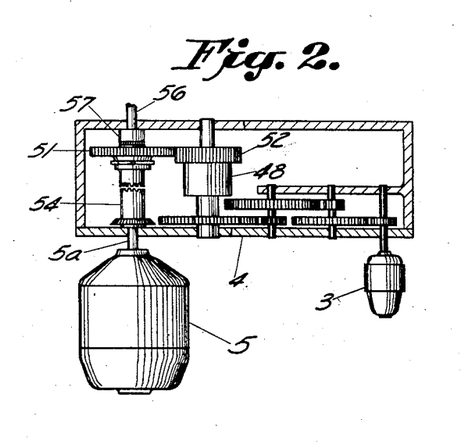
Fig. 2 is a horizontal section in the plane of the motor shafts through the gear box on Fig. 1, showing the gearing which connects the positioning motor 3, which may also be the feed motor, with the rapid traverse motor 5, and also the magnetic clutch which connects or disconnects the gearing driven by motor 5 with the gearing driven by motor 3.

Referring to the drawings, 1 is the bed of a planer-type milling machine. 2 is the table which slides along the bed of the milling machine. 3 is a motor which, by means of gearing partly contained in gear box 4 and partly contained in bed 1, serves to move the table slowly and precisely into position. The kind of gearing employed is not of importance and forms no part of this invention. It is only necessary that the gear reduction be sufficient so that when motor 3 is revolving at its lowest normal speed, the table 2 travels at the rate of somewhere between ¼" and 4" per minute. 5 is a motor which serves to rapid traverse the table at any suitable speed, say 15 to 20 feet per minute. Motor 5 is connected to the gear train where the speed of rotation of the gearing is only a fraction of that of motor 3. When energized motor 3 will cause the armature of motor 5 to revolve slowly. The gearing driven by motor 3 is connected to the gearing driven by motor 5 by means of a magnetic clutch 48, as shown in Fig. 2, or by means of any other suitable type of clutch.

Throughout this disclosure, a magnetic clutch is assumed, although other clutches disengaged by the rotation of motor 5 may be and have been employed. The purpose of the magnetic clutch is to disconnect the gearing intermediate between motor 3 and motor 5 when motor 5 is energized, so that motor 3 will not be driven by motor 5, since if the gearing driven by motor 3 were not then disconnected, motor 3 would be driven by motor 5 at dangerously high speed, and the gearing between the two motors severely strained.

Fixed to the side of the bed is control box 6 which will be described in detail later, and from which projects micrometer head 7—a, the anvil of which can be adjusted through a distance of 1". When the micrometer head is caused to move by the index slide advancing against it, the control means functions in such a way as to first stop motor 5, then to engage the magnetic clutch, then to slow down and finally to stop motor 3 so that the table, after rapid traversing, moves slowly and finally comes to rest in index position.

Figures 3, 4, 14:
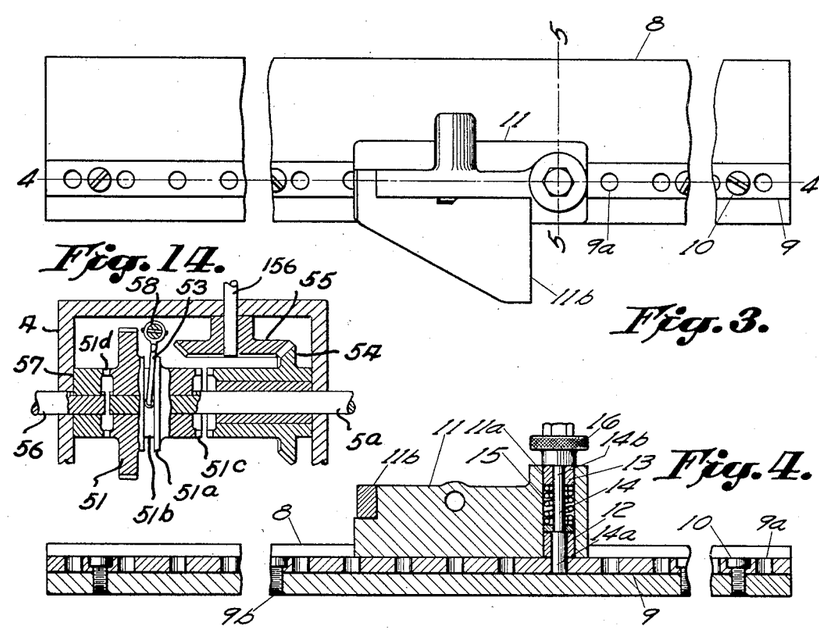
Fig. 3 is a front view of the index carrier which is attached to the side of the table of the milling planer.
Fig. 4 is a longitudinal section through the index carrier on line 4—4 of Fig. 3.
Fig. 14 is a portion of a vertical section through box 4 in the plane of the axis of the shaft of motor 5.
Figure 5:
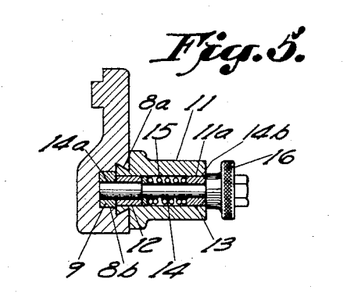
Fig. 5 is a cross section of the index carrier on line 5—5 of Fig. 3.

To the side of the table is fixed a carrier 8 shown in detail in Fig. 3. In this carrier is planed a dovetail slot 8—a and at the bottom of this, a rectangular slot 8—b in which are screwed a number of index bars 9. We prefer to make these index bars rectangular in section and exactly 10" long. In each bar are machined ten cylindrical holes 9—a, all of exactly the same diameter and the center of each exactly one inch from the center of the adjacent holes. The centers of all of the holes lie on a line exactly parallel with the edges of the bars. Also, in each bar are drilled and countersunk two or more holes 9—b in which are screws 10 which serve to fasten the index bars to the carrier.

Sliding in the dovetail of the carrier, is slide 11 in which is machined a cylindrical hole 11—a in which are pressed bushes 12 and 13. Bush 12 is bored to the same diameter as the holes in the index bars, while bush 13 is bored to the same diameter as the stem of the index plunger 14. The large end 14—a is a snug fit in bush 12 and also in any of the holes in the index bars, while the small end 14—b is a snug fit in bush 13. Between bush 13 and the end 14—a of plunger 14 is spring 15 which tends to press the plunger into a hole in the index bar. At the end of the plunger is fastened a knob 16 by which the plunger can be pulled out or pushed into any one of the holes in the index bars. On slide 11 is projection 11—b which is adapted to impinge on the anvil of the micrometer head 7—a whenever the table is so moved as to cause the two to make contact.

Figure 6:
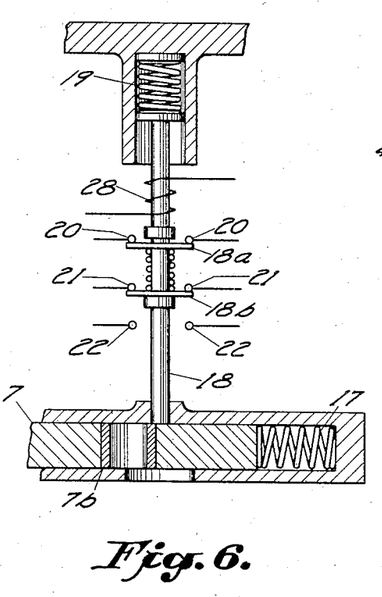
Fig. 6 is a diagrammatic drawing of a quick acting switch which may be employed to stop the table at a desired position in its travel.

In order to explain the theory of the electrical control mechanism by which the operation of bringing the table to rest is performed at a given point in its path, it will be assumed that the quick acting switch shown diagrammatically in Fig. 6 is contained in control box 6. In the control box is a control slide 7 on the end of which is a micrometer head not shown in Fig. 6. In the control slide 7 is a hole in which is bush 7—b, the edges of the bush being sharp and the bush being hardened. Slide 7, which moves smoothly in a hole machined in the control box 6, is forced to the left by spring 17. When the projection 11—b on slide 11 encounters the anvil of the micrometer head as table 2 moves, slide 7 is forced against spring 17 until the hole in bush 7—b comes opposite the hardened end of stem 18 of the quick acting switch. At the upper end of stem 18 is spring 19 which is under compression, and which forces stem 18 into the hole in bush 7—b. The instant the edge of the hole has passed the edge of the stem, spring 19 forces stem 18 quickly downward. Attached to stem 18 are connectors 18—a and 18—b. When the stem is in its upper position connector 18—a connects the contact points 20 and connector 18—b connects contact points 21. As soon, however, as spring 19 forces the stem 18 downward, the circuit between contact points 20 and the circuit between contact points 21 is interrupted, and the stem continues downward until connector 18—b establishes a circuit between contact points 22.

Figure 7:
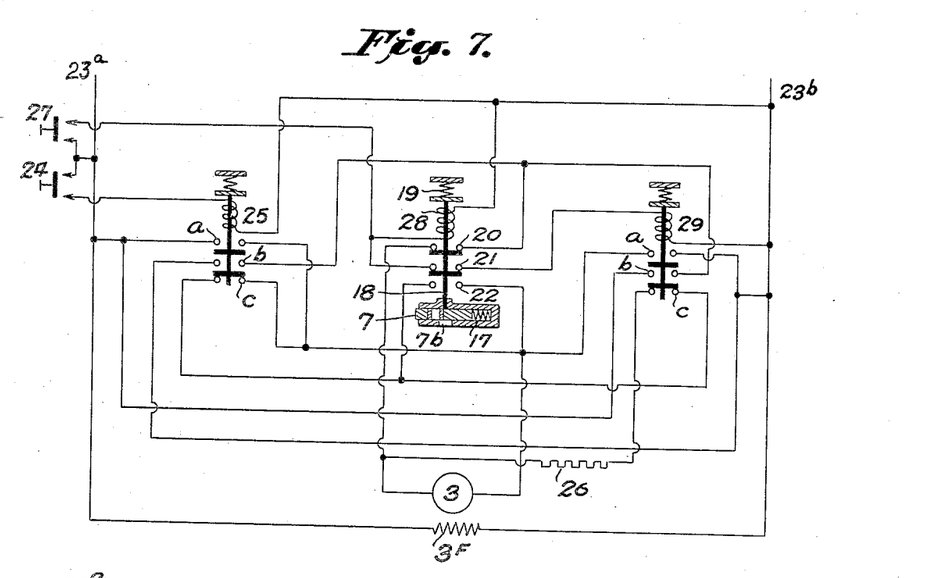
Fig. 7 is a simplified circuit diagram for operating motor 3 with the quick acting switch shown in Fig. 6.

Referring now to Fig. 7 the circuit so operated is there shown, in which contacts 20, 21 and 22 are shown as normally open or normally closed accordingly as to whether they are connected by their respective connectors or not when the quick acting switch is in its upper position as shown in Fig. 6. 23—a and 23—b are the two supply lines. 24 is a push button. When push button 24 is pressed, supply line 23—a is connected to supply line 23—b through coil 25 which, upon being energized, first opens normally closed contacts 25—c, and then closes normally open contacts 25—a and 25—b.

This establishes a circuit from line 23—a through normally open contacts 25—a, motor 3, the now connected contacts 20 of the quick acting switch, and the normally open contacts 25—b to line 23—b. The field of the motor 3—f, has already been energized when voltage was applied to lines 23—a and 23—b by closing a knife switch, or in any other suitable manner. Motor 3 thereupon begins to revolve in such a direction as to cause the table to move toward index position and continues to revolve in this direction until control slide 7 is moved by index slide projection 11—b far enough so that the quick acting switch will be actuated by spring 19.

Immediately, contacts 20 and contacts 21 are disconnected by the movement of the switch, followed by the connection of contacts 22. This disconnects the motor 3 from the supply of power by disconnecting contacts 20 and at the same time causes dynamic braking by connecting contacts 22, which allows current from the armature of motor 3 to flow through contacts 22, normally closed contacts 29—c and dynamic braking resistance 26, bringing the motor quickly to rest, and stopping the table in index position.

When the thumb is released from push button 24, coil 25 will be deenergized, contacts 25—a and 25—b will be opened and contacts 25—c will be closed.

When it is desired to move the table in the opposite direction, that is, away from index position, button 27 is pressed. Since contacts 21 are now disconnected, coil 28 will be energized and coil 29 will not be energized. Energizing coil 28 causes the stem 18 of the quick acting switch to be lifted against the pressure of spring 19, thus disconnecting contacts 22, connecting contacts 20, and also connecting contacts 21. The connecting of contacts 21 causes coil 29 to be energized which thereupon opens normally closed contact 29—c and closes normally open contacts 29—a and 29—b. This causes motor 3 to revolve in the direction which causes the table to move away from index position.

Immediately, spring 17 pushes control slide 7 into such a position that stem 18 can no longer move downward, and when the table has moved a sufficient distance, the finger is removed from button 27 which deenergizes coils 28 and 29, thereby allowing spring 19 again to press stem 18 downward against control slide 7, and opening contacts 29—a and 29—b and closing contact 29—c, whereby motor 3 is brought to rest by dynamic braking.

Figure 8:
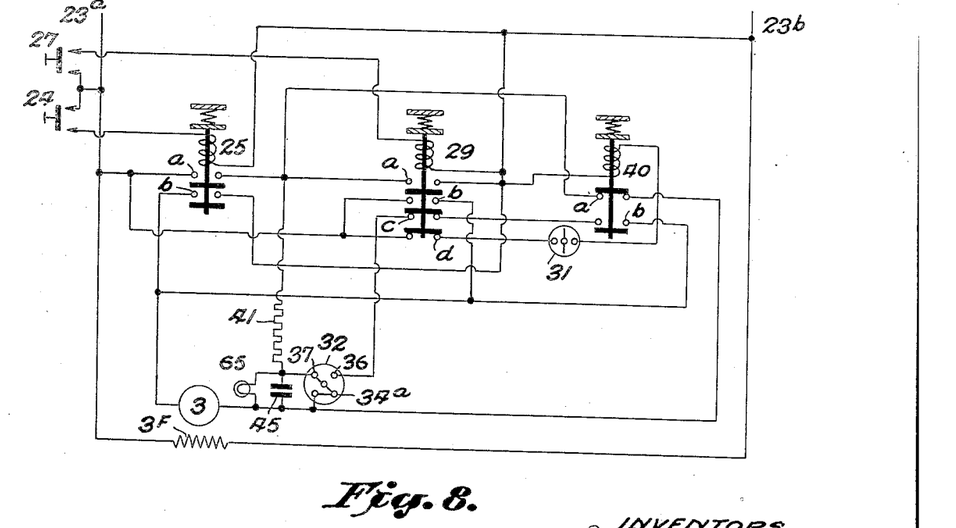
Fig. 8 is a simplified circuit diagram for operating motor 3 when two close motion switches are employed in order to stop motor 3 with the table in a desired position.

A more delicate adjustment of the table may be obtained by employing the circuit shown in Fig. 8 in which 23—a and 23—b are the supply lines, 3 the motor armature, 3—F the motor field, 24 the push button to cause the control to move the table to the index position, 27 the push button which causes the control to move the table in the reverse direction, or away from the index position, and coils 25 and 29 have similar functions to those which they had in the previous circuit.

On pressing button 24, coil 25 is energized which closes normally open contacts 25—a and 25—b, permitting current to flow from line 23—a, through 25—a, through normally closed contacts 40—a, through motor armature 3, and through contacts 25—b to line 23—b, and causing the motor armature to revolve in such a direction as to advance the table to index position.

Figure 9:
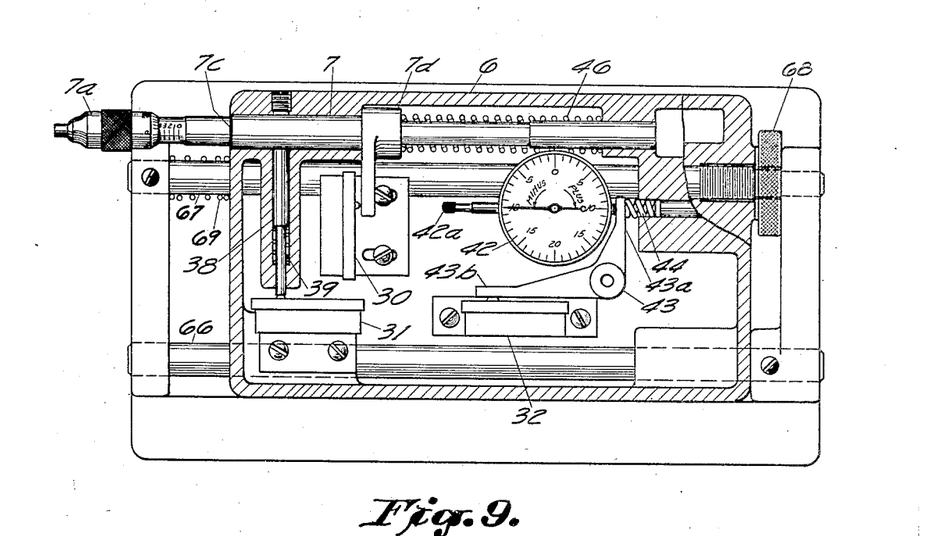
Fig. 9 shows the arrangement of the parts usually employed in the control box 6.

In order to understand the action of this circuit, it will be necessary to refer to Fig. 9, in which 6 is the control box in which slides a movable control element which is control slide 7, on the end of which is micrometer head 7—a. Inside of control box 6 are three close motion switches 30, 31 and 32. Switch 30 takes no part in the action when a rapid traverse motor is not employed, and therefore does not appear in the circuit shown in Fig. 8. These switches may be a commercial product and are described in Patent No. 1,780,578. Switches 30 and 31 are shown in section in Fig. 11. They consist of a case of insulating material 33, in which is a leaf spring 34, which is attached at one end to a conducting block 34—a and to the other end of which is attached contact 34—b. Near the center of its length, the spring 34 presses against abutment 33—a. Against the leaf spring, when it is in its normal position in our device, there presses a plunger 35, of insulating material, which holds the contact 34—b away from the contact 36. However, if plunger 35 is allowed to move upward, at a certain point in its movement the leaf spring 34 will snap into the position shown, where 34—b makes contact with 36, so that current may flow between conducting block 34—a and contact 36 through leaf spring 34, which is of conducting material.

The form and temper of the leaf spring is such that only a very slight downward movement of plunger 35 is required to deform the spring in such a manner as to move contact 34—b a considerable distance away from contact 37.

Switch 32, shown in Fig. 12 is similar to switches 30 and 31 except it is supplied with a second contact 37. When plunger 35 of spring 33 is depressed slightly, as is the case in the normal position, the leaf spring 34 is deformed in such a way that it holds contact 34—b against contact 37, and current may flow between 34—a and 37. When plunger 35 is allowed to move a few thousandths of an inch, at a certain point in its movement the leaf spring snaps 34—b into contact with 36 so that the circuit between 34—a and 37 is suddenly broken, and one is completed between 34—a and 36.

Within control box 6 is a hole in which slides plunger 38, held against control slide 7 by spring 39, the end of plunger 38 engaging the plunger 35 of switch 31 and holding contact 34—b away from contact 36 so that switch 31 is normally open as shown in Fig. 8. As the index slide projection 11—b moves control slide 7 to the right, shoulder 7—c passes over the end of plunger 38, permitting spring 39 to raise it, which permits switch 31 to close with a snap.

This energizes coil 40 which opens normally closed contacts 40—a and closes normally open contacts 40—b, thus compelling the motor armature to receive its current through a high resistance 41, and thence through contact 37 of switch 32. This greatly reduces the electromotive force imposed on the motor armature, and causes the motor to slow down to a low speed. The motor continues to run in the same direction, slide 7 moving to the right until bracket 7—d, attached to slide 7, comes in contact with the end of stem 42—a of dial indicator 42. Immediately, the hand of the indicator begins to revolve, and as stem 42—a moves to the right, the right hand end of the stem presses against one arm 43—a of bell crank lever 43. This arm is moved slightly against spring 44, which has been holding the bell crank in such a position that the other arm 43—b has been pressed against plunger 35 of switch 32. As soon as 43—b has moved a few thousandths of an inch, leaf spring 34 of switch 32 snaps contact 34—b away from contact 37 and against contact 36.

The armature of motor 3 no longer having an impressed electromotive force, and being short circuited through switch 32 and normally closed contacts 29—c, it is immediately brought to rest by dynamic braking with the table in index position. Since the motor armature has just been operating under greatly reduced voltage and at low speed, the energy to be dissipated by dynamic braking is small, and a dynamic braking resistance is not necessary nor advisable.

The purpose of contacts 40—b is to prevent potential difference from occurring between contacts 36 and 37 and so to reduce the liability of switch 32 to injury.

In order that contacts 34—b and 37 shall not be pitted by arcing when the circuit is broken, condenser 45 may be inserted in the circuit between contact 37 and conducting block 34—a. This condenser is not essential to the action of the control, and has no effect except to prolong the life of switch 32.

In order that the operator may know when the indexing operation is complete, a small electric light bulb 65 is connected in parallel with condenser 45. When switch 32 is in such a position as to shunt condenser 45 and bulb 65, any current flowing through resistance 41 will flow through the switch and not through the bulb. However, when switch 32 is allowed to snap, contact 34—f will touch contact 36 instead of contact 37, and current will flow through resistance 41, through the bulb, through switch 32, and contacts 29—c and 40—b, permitting the bulb 65 which had previously been short circuited, to light. The lighting of the bulb acts as an electrical signal, informing the operator that the movement of switch 32 is completed, and that he may release his finger from the button.

When the finger is removed from button 24 coil 25 will be deenergized, opening contacts 25—a and 25—b. If button 24 is again inadvertently pressed, nothing will happen since coil 40 is holding 40—a open, and the motor cannot be energized through switch 32 or contacts 40—a.

When it is desired to cause the table to move in the opposite direction, button 27 is pressed, which energizes coil 29. This opens contacts 29—c and 29—d. The opening of contact 29—d deenergized coil 40, which caused contact 40—b to open and 40—a to close. As soon as 29—c and 29—c have opened, contacts 29—a and 29—b close, energizing the armature of motor 3 and causing it to revolve in such a direction as to move the table away from index position. Spring 46 on control slide 7 immediately presses bracket 7—d away from the stem 42—a of indicator 42. Spring 44 immediately moves bell crank 43, which presses on plunger 35 of switch 32 causing its leaf spring 34 to snap contact 34—b from contact 36 to contact 37. Since the circuit which includes 34—a and 36 has been interrupted at 29—c, no current is flowing at the time that 34—b separates from 36 and no arcing occurs. The motor continues to revolve until spring 46 presses the shoulder 7—c against plunger 38, forcing it down into contact with plunger 35 of switch 31, opening this switch which is in a circuit including contacts 29—d which are now open, so that when switch 31 opens no current is flowing.

When the table has moved to the desired point the finger is removed from button 27, deenergizing coil 29, which causes contacts 29—a and 29—b to open and 29—c and 29—d to close, thus deenergizing the armature of motor 3 and causing it to coast to rest.

Referring to Fig. 16, there is there shown an alternative arrangement of a part of circuit shown in Fig. 8, which stops armature 3 in a different manner. Assume that the armature of motor 3 is energized through normally closed contact 40a in Figure 16. As soon as coil 40 in Fig. 8 is energized 40a will be opened and 40b will be closed. Armature 3 will thereupon receive its current through resistance 41, and signal bulb 65 will light. As soon, however, as switch 32a is caused to close by the movement of the moveable control element (single throw switch 32a taking the place of double throw switch 32) armature 3 will be short circuited through switch 32a, whereupon dynamic braking will occur and the armature will come to rest. As soon as switch 32a closes bulb 65 will be extinguished. In this case switch 32a does not disconnect the armature 3 from either supply line but merely applies dynamic braking, and because of its low resistance, diverts the current from resistance 41, which would otherwise pass through the armature.

Referring to Fig. 14, 5—a is the extended shaft of motor 5 on which is slidably keyed a gear 51. This gear meshes with gear 52, shown in Fig. 2, which is coupled to the gearing driven by motor 3 by means of magnetic clutch 48. Gear 51 has an extended hub 51—a in which is a groove 51—b so that the gear may be shifted by fork 53. On each end of gear 51 are cut clutch teeth 51—c and 51—d. The clutch teeth 51—c engage with corresponding clutch teeth cut on bevel gear 54 which is bushed and turns freely on shaft 5—a and is retained in place by a wall of box 4. Gear 54 meshes with gear 55 which is keyed to shaft 156 which serves to drive the feed mechanism in box 104 at the end of rail 101 on which moves head 102. When fork 53 shifts gear 51 so that it is declutched from bevel gear 54, it is clutched to clutch 57 which is keyed fast to shaft 56 which drives gearing not shown, contained within bed 1, which moves table 2. It will thus be seen that when gear 51 is shifted to the left, motors 3 and 5 serve to drive the table only, and when it is shifted to the right motors 3 and 5 are disconnected from shaft 56, and coupled to bevel gear 55 which serves to drive the head along the rail in the manner usual in the art.

Fork 53 is pinned fast to shaft 58 to which is pinned lever 59 at the end of gear box 4 so that by moving lever 59, table 2 or head 102 may be caused to move by means of motors 3 and 5, in the manner desired.

Figure 13:
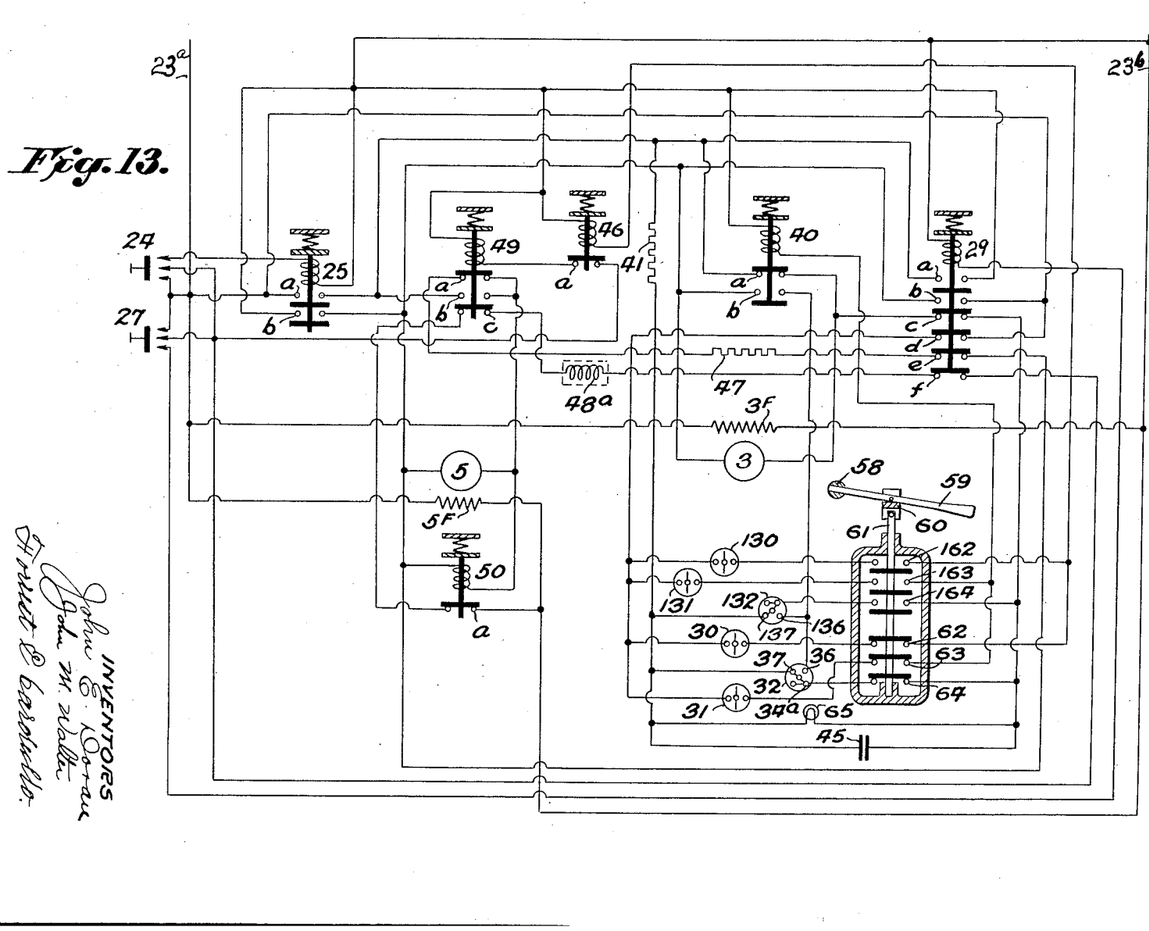
Fig. 13 is a simplified circuit diagram for operating motors 3 and 5, when rapid traverse is employed and six close motion switches are used in order to rapid traverse and stop both table 2 and milling head 102, in desired positions.

Link 60 fits a pin in lever 59, and also a pin in stem 61 which actuates the switches shown diagrammatically in Fig. 15, and also distributed in the proper places in their circuits in Fig. 13. On stem 61 are three conductors 62, 63 and 64, which when gear 51 is in position to operate the table, touch the contacts shown, so as to close gaps in circuits in which are switches 30, 31 and 32. At the same time conductors 162, 163 and 164 are separated from their coacting contacts, leaving gaps in the circuits in which are switches 130, 131 and 132. When lever 59 is moved so as to shift gear 51 from clutch engagement with clutch 57 on shaft 56, which moves the table, and into clutch engagement with gear 54 which moves the head, stem 61 is so moved that conductors 62, 63 and 64 are separated from their coacting contacts, interrupting the circuits in which are switches 30, 31 and 32, and conductors 162, 163 and 164 touch their coacting contacts, and close the gaps previously existing in the circuits in which are switches 130, 131 and 132.

Switch 62 in series with switch 30, switch 63 in series with switch 31, and switch 64 in series with switch 32, are closed by the movement of stem 61 when gear 101 is in such a position as to drive the table. In this position, switches 162, 163 and 164 are open. When, however, lever 59 is so moved as to cause gear 51 to drive gear 54 and shaft 156, so that head 102 may be moved instead of table 2, the movement of stem 61 opens switches 62, 63, and 64, and closes switches 162, 163 and 164 so that switches 130, 131 and 132 will control the stoppage of motors 3 and 5. Since switches 130, 131 and 132 are contained in control box 106, the movement of the head is stopped when the head itself comes in contact with the control slide in control box 106, and pushes it sufficiently to actuate the three switches.

It will thus be seen that the electrical equipment, except for the close motion switches 30, 31 and 32 and 130, 131 and 132, is common to both the head and the table.

Fig. 13 is a simplified wiring diagram of a circuit adapted to utilize both a rapid traverse motor 5 and a positioning motor 3 to position two moveable members, such for instance, as the table 2 and the milling head 102.

We will assume that the table will be positioned first, in which case the clutch gear 51 will be in such a position that it will engage the table driving mechanism, and because of the position of the lever 59, contacts 62, 63 and 64 will be closed and contacts 162, 163 and 164 will be opened. 23—a and 23—b are supply lines as before. 3 is the positioning motor with its field 3—F. 5 is the rapid traverse motor with its field 5—F, and 24 is the push button which is pressed in order to move the table toward index position. Pressing button 24 energizes coil 25 and since contacts 46—a are normally closed, it also energizes coil 49. Energizing coil 25 closes contacts 25—a and 25—b, and energizing coil 49 opens contacts 49—a and 49—c and closes contacts 49—b. Since 49—c is now open, the coil 48—a of magnetic clutch 48 is deenergized, and gear 52 may revolve without turning the gearing in box 4 driven by motor 3. The armature of motor 5 being energized, the table will be moved toward index position. Also coil 50 will be energized, opening contacts 50—a. When projection 11—b on index slide touches micrometer head 7—a, control slide 7 moves and bracket 7—d moves away from the plunger of switch 30, which closes, energizing coil 46.

This opens contacts 46—a, deenergizing coil 49, which allows contacts 49—b to open, and contacts 49—a and 49—c to close, deenergizing the armature of motor 5 and stopping it by dynamic braking through resistance 47. So long as the armature generates counter electromotive force, coil 50 will be energized and contacts 50—a will remain open. When the armature of motor 5 comes to rest, contacts 50—a will close, coil 48—a will be energized, and magnetic clutch 48 will engage.

During the time since 24 was pressed, the armature of motor 3 has been energized and running. As soon as clutch 48 engages, motor 3 begins to move the table at a low rate of speed, and continues to do so until the shoulder 7—c of the control slide 7 moves past plunger 38, releasing the plunger of switch 31, allowing it to close. This energizes coil 40 which opens normally closed contacts 40—a and closes normally open contacts 40—b. The armature of motor 3 now receives its current through resistance 41, switch 32, switch 64, and normally closed contacts 29—c, and runs at a much slower rate of speed.

Finally, bracket 7—d makes contact with stem 42—a of dial indicator 42, actuating bell crank 43, and allowing switch 32 to snap so that it makes contact with contact 36 instead of contact 37, thus short-circuiting the armature of motor 3 and bringing it to rest by dynamic braking. While stem 42—a of indicator 42 is moving, the hand of the indicator also revolves, indicating the position of control slide 7, the hand coming to rest when the control slide 7 and the table 2 also come to rest, which will be indicated by the lighting of bulb 65.

In use, the dial of the indicator is turned until the hand registers zero when the table has come to rest in index position. If the table is backed away and then again brought into index position, the hand should again point to zero, or else the error indicated should be within the allowable limit of tolerance.

If, after the table comes to rest, button 24 is again accidentally pressed, since coils 40 and 46 are energized, contacts 46—a, 49—b and 40—a will be open, and neither of the motors can be energized.

When it is desired to return the table from index position, button 27 is pressed, energizing coil 29. This immediately opens contacts 29—c, 29—d, 29—e and 29—f which deenergizes coils 40 and 46, permitting 46—a to close and 49 to be energized. Also, 29—a and 29—b will close, as will 49—b, thus energizing the armature of motor 5.

Obviously with 29—f open, coil 48—a of magnetic clutch 48 cannot be energized. The armature of motor 5 will revolve in such a direction as to back the table away from indexed position, opening successively switches 32, 31 and 30 which, however, are not at that time carrying current. When the finger is removed from button 27, all contactors return to the condition shown in Fig. 13 as soon as the dynamic braking cycle of motor 5 is completed, permitting contacts 50—a to close.

If it is desired to move the head toward index position, lever 59 is raised, causing gear 51 to make clutch engagement with gear 54, opening switches 62, 63 and 64, and closing switches 162, 163 and 164. The table will no longer move, but shaft 156 acting through the gearing in box 104 and through a feed screw not shown provided for moving the head 102, when button 24 is pressed, will move the head toward the index position. As it approaches index position the control slide in control box 106, in which are also contained switches 130, 131 and 132, will begin to move, the switches being actuated in the order named, and performing the same functions respectively as switches 30, 31 and 32, and the mechanism will act to bring the head to rest in index position in an exactly similar manner as it did when the table was brought to rest in index position.

Pressing button 27 will cause the electrical mechanism to act to move the head away from index position, in the same way as it acted when moving the table away from index position.

In case the head or the table does not come accurately to index position, as shown by the hand of the indicator, pressing button 27 to move it away and then pressing button 24 to move it again into indexing position, will correct the error, unless it is due to some persistent imperfection in the operation of the motors and controls.

It will be noted that the close motion switches are so arranged in the circuits as not to break contact when transmitting current, except that switches 32 and 132 break contact when transmitting a very small current. The effect of this may be minimized by the use of condenser 45, connected in the manner shown. It is not essential that the circuits be arranged in this manner, since the switches are capable of breaking the currents required to actuate the relays, but by arranging them in this manner, any chance of damage from arcing may be avoided. It will also be noted that the mechanical parts move away from the switches when the switches are caused to function, so that any overrunning of the mechanical parts cannot damage the switches.

Finally, a signal bulb 65 is inserted in the circuit in the manner shown, so that it will light when not short circuited by switch 32 or switch 132, and so indicate the final completion of the indexing operation.

Figure 10:
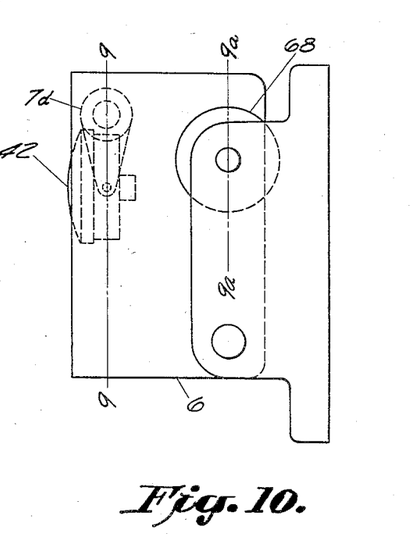

Referring to Figs. 9 and 10, it will be noted that the control box 6 slides upon two cylindrical bars 66 and 67. The upper bar 67 is threaded at one end and on it is thumb nut 68. At the other end of the bar is spring 69 which forces box 6 against the thumb nut. The purpose of the thumb nut is to adjust the mechanism so that the micrometer will read zero at the starting point of a job.

The method of using the apparatus is as follows:

Assume that a piece of work is placed on the table, in which one or more holes are to be bored. The longitudinal distance of the center of each hole from a transverse vertical plane which passes through some point on the work, such as the end, or the center of the first hole, is assumed to be known. This plane may be called the transverse zero plane.

The thumb nut 68 is screwed all the way back, the micrometer head 7—a is set to read zero, the index plunger 14 is placed in a convenient hole, and button 24 is pressed, advancing the work and the table to index position. The dial of the indicator is then set so that the hand points to zero.

The longitudinal distance from the axis of the spindle to the transverse zero plane of the work, from which subsequent measurements are to be made, is then measured. The index slide is then moved a distance equal to the number of integral inches from the spindle axis to the zero plane and the micrometer is set to read the decimal part of an inch remaining. The table is again brought to index position, and the transverse zero plane will then contain the spindle axis. The micrometer head 7—a is then set to read zero, and the thumb nut 68 is turned until the indicator hand again points to zero. The hole in the index slide carrier, in which the index plunger then is, is the zero hole. If the index slide be again moved a given distance, say five inches, and the table again indexed, the spindle axis will be five inches from the transverse zero plane. If, in addition, the micrometer were set to read some decimal of an inch, say .250 inches, the spindle axis would then be 5.250 inches from the transverse zero plane. By moving the index slide the proper number of inches from the zero hole, and setting the micrometer to read the proper decimal of an inch, and then indexing the table, the table will come to rest with the spindle axis over the work, and at the proper longitudinal distance from the transverse zero plane.

Similarly there will be a longitudinal zero plane, and by indexing the head, measuring the distance from the spindle axis to the longitudinal zero plane, backing the head away, setting the index box 106 over the proper number of inches, and setting the micrometer to indicate the remaining decimal, and again indexing the head, the spindle axis will lie in the longitudinal zero plane. It will be understood that the index box 106 on the head is provided with means of adjustment similar in principle to the adjustment shown for box 6, so that the indicator in box 106 may be made to read zero when the plunger of this box is in the zero hole, and the micrometer is set to read zero.

By successively indexing the table and the head to the two coordinates measured from the two zero planes, as shown on or figured from the drawings provided for performing the work, the table and the head may be brought into such relative position that the spindle axis will pass through the required point on the upper surface of the work.

After completing the boring of the first hole, the table and head will be indexed so that the spindle axis coincides with the axis of the second hole, and so on to the completion of the work.

It will be apparent that the head, the table, or both, may be indexed in a similar manner for performing other operations than boring, or for any other purposes for which such a device may be useful.

The essential features of the invention are the use of a direct acting control element such as the quick acting switch shown in Fig. 6, or the close motion switch 32, to complete the stoppage of the positioning motor when it is running at a sufficiently slow speed so that the movable member will be positioned with the requisite accuracy, the use of the dial indicator, or some analagous device, to check the accuracy of the index position by indicating the position of the movable control element when stopped after indexing, and the use of an incremental measuring device in connection with a micrometer head to make the measurements of the different index positions convenient and expeditious. Furthermore the measuring device is used in such a manner that it is one of the chain of functional elements interposed between the movable member and the fixed member, which, working together, stop the movable member in the desired position relative to the fixed member.

In the device disclosed the direct acting control element or switch does not function through relays or other devices, but when its action has been initiated by the movable control element at a certain definite point in the movement of the latter, the direct acting control deenergizes and dynamic brakes the positioning motor. However, any type of control device which will function with sufficient rapidity and uniformity after the movable control element reaches a certain definite position, will serve as well. In its entirety the invention provides means for rapid traversing the movable member with one power means, for automatically changing from rapid traverse to slow motion obtained from a second power means, for still further slowing the rate of slow motion and for stopping the movable member in its desired position by stopping the second power means, measuring means, indicating means, and signal means, together with control means for moving the movable member back from its index position.

It is obvious that the several parts of the apparatus described may be arranged in many different ways without in any way changing the functions or purpose of the parts. Also any one familiar with the use of electrical control devices may re-arrange the circuits in many ways and still accomplish the same results.

Furthermore, hydraulic or pneumatic equipment may be substituted for the electric equipment, by using for control means suitable interconnected valves instead of the coils and contacts, in order to rapid traverse and then slowly position the moveable member, and then by using a direct acting multiported valve, to quickly shut off the inflow and outflow of the fluid to and from the cylinder or fluid motor, at a certain definite position in the movement of a moveable control element. We therefore do not wish to limit the scope of the invention to the particular type of equipment disclosed, but wish to include all forms of devices falling within the scope of the appended claims.

What is claimed is,

1. In combination, a fixed member, a moveable member, power means adapted to cause the moveable member to move with reference to the fixed member at a suitable speed, control means for causing the power means to move the moveable member toward a desired position, a direct acting control element for stopping the power means, and a moveable control element actuated by the movement of the moveable member as it approaches the desired position, adapted to initiate the action of the direct acting control element when the said moveable control element reaches a definite position in its movement.

2. In combination, a fixed member, a moveable member, power means adapted to cause the moveable member to move with reference to the fixed member at a suitable speed, control means for causing the power means to move the moveable member toward a desired position, a direct acting control element to stop the power means, a moveable control element actuated by the movement of the moveable member as it approaches the desired position, adapted to initiate the action of the direct acting control element when the said moveable control element reaches a definite position in its movement, and means for indicating the position of the moveable control element when stopped.

3. In combination, a fixed member, a moveable member, power means adapted to cause the moveable member to move with reference to the fixed member at a suitable speed, control means for causing the power means to move the moveable member toward a desired position, a direct acting control element to stop the power means, a moveable control element actuated by the movement of the moveable member as it approaches the desired position, adapted to initiate the action of the direct acting control element when the said moveable control element reaches a definite position in its movement, and means for indicating when the direct acting control element has functioned.

4. In combination, a fixed member, a movable member, power means adapted to cause the moveable member to move with reference to the fixed member at a suitable speed, control means for causing the power means to move the moveable member toward a desired position, a direct acting control element to stop the power means, a moveable control element actuated by the movement of the moveable member as it approaches the desired position, adapted to initiate the action of the direct acting control element when the said moveable control element reaches a definite position in its movement, and measuring means adapted to affect the relative position of the moveable member and the fixed member when the motion of the moveable member initiates the action of the direct acting control element.

5. In combination, a fixed member, a moveable member, power means adapted to cause the moveable member to move, a first control means for causing the power means to move the moveable member toward a desired position, a second control means for slowing down the motion of the power means to a suitable rate, a third control means for stopping the power means, and a moveable control element actuated by the movement of the moveable member as it approaches the desired position, adapted to actuate the second control means when it reaches a first position in its movement, and to actuate the third control means when it reaches a second and definite position in its movement.

6. In combination, a fixed member, a moveable member, power means adapted to cause the moveable member to move, a first control means for causing the power means to move the moveable member toward a desired position, a second control means for slowing down the motion of the power means to a suitable rate, a third control means for stopping the power means, a moveable control element actuated by the movement of the moveable member as it approaches the desired position, adapted to actuate the second control means when it reaches a first position in its movement, and to actuate the third control means when it reaches a second and definite position in its movement, and means for indicating the position of the moveable control element when stopped.

7. In combination, a fixed member, a moveable member, power means adapted to cause the moveable member to move, a first control means for causing the power means to move the moveable member toward a desired position, a second control means for slowing down the motion of the power means to a suitable rate, a third control means for stopping the power means, a moveable control element actuated by the movement of the moveable member as it approaches the desired position, adapted to actuate the second control means when it reaches a first position in its movement, and to actuate the third control means when it reaches a second and definite position in its movement, and means for indicating when the third control means has functioned.

8. In combination, a fixed member, a moveable member, power means adapted to cause the moveable member to move, a first control means for causing the power means to move the moveable member toward a desired position, a second control means for slowing down the motion of the power means to a suitable rate, a third control means for stopping the power means, a moveable control element actuated by the movement of the moveable member as it approaches the desired position, adapted to actuate the second control means when it reaches a first position in its movement, and to actuate the third control means when it reaches a second and definite position in its movement, and measuring means adapted to affect the relative position of the moveable member and the fixed member when the motion of the moveable control element actuates the third control means.

9. In a measuring device, an index slide carrier having guiding wave formed integral therewith and equal holes spaced equi-distant therealong, an index slide adapted to be guided by said guiding ways, a plunger in the index slide adapted to engage any of the said holes for exactly locating the index slide relative to the carrier, and a micrometer head used in conjunction therewith.

10. In a measuring device associated with a fixed member and moveable member, an index slide carrier having guiding ways formed integral therewith and equal holes spaced equi-distant therealong, an index slide adapted to be guided by the said guiding ways, a plunger in the slide adapted to engage any of the said holes for exactly locating the index slide relative to the carrier, a micrometer head used in connection therewith, a moveable control element, and indicating means adapted to show the position of the moveable control element during part of its motion.

11. In combination, a fixed member, a moveable member, a motor adapted to move the moveable member upon the fixed member, control means for causing the motor to move the moveable member toward a desired position, a direct acting switch for stopping the motor, and a moveable control element actuated by the movement of the moving member and adapted to initiate the action of the direct acting switch at a particular point in the movement of the moveable control element.

12. In combination, a fixed member, a moveable member, a motor adapted to move the moveable member upon the fixed member, manually operable means adapted to cause the motor to move the moveable member toward a desired position, a moveable control element actuated by the movement of the moveable member, a first control means actuated by the moveable control element and adapted to cause the motor to move at a slower rate, and second control means actuated by the moveable control element when moved to a definite position, adapted to stop the motor.

13. In combination, a fixed member, a moveable member, a motor adapted to move the moveable member upon the fixed member at a suitable speed, manually operable control means adapted to cause the motor to move the moveable member toward a desired position, a moveable control element actuated by the movement of the moveable member, a direct acting control element actuated by the moveable control element when in a definite position and adapted to stop the motor, indicating means actuated by the moveable control element adapted to show the position of the moveable control element when stopped, and measuring means adapted to affect the relative position of the fixed and moveable members when the motion of the moveable control element initiates the action of the direct acting control element.

14. In combination, a fixed member, a moveable member, power means adapted to move the moveable member upon the fixed member, a first manually operable control means adapted to cause the power means to move the moveable member toward a desired position, a moveable control element actuated by the movement of the moveable member when it approaches the desired position, a second control means actuated by the moveable control element and adapted to cause the power means to move the moveable member toward the desired position at a lower rate of speed, a third control means actuated by the moveable control element when in a definite position and adapted to cause the power means to stop, an indicator actuated by the moveable control element and adapted to show the position of the moveable control element when stopped, and a fourth manually operable control means adapted to cause the power means to move the moveable member away from the desired position.

15. In combination, a fixed member, a moveable member, a first motor adapted when energized or when revolved to move the moveable member upon the fixed member, a train of mechanism adapted to revolve the first motor, a second motor adapted to drive the train of mechanism, automatic clutch means in the train of mechanism adapted to disconnect the train when the first motor is energized and to reconnect the train when the first motor is deenergized, a first control means adapted to cause the first motor to move the moveable member toward a desired position, a second control means adapted to stop the first motor by dynamic braking when the moveable member is near the desired position, a third control means adapted to cause the second motor to revolve at a lower rate of speed while continuing the motion of the moveable member toward the desired position, a fourth control means for stopping the second motor, and a moveable control element for automatically actuating successively the second, third, and fourth control means.

16. In combination, a fixed member, a moveable member, a first motor adapted when energized or when revolved to move the moveable member upon the fixed member, a train of mechanism adapted to revolve the first motor, a second motor adapted to drive the train of mechanism, automatic clutch means in the train of mechanism adapted to disconnect the train when the first motor is energized and to reconnect the train when the first motor is deenergized, a first control means adapted to cause the first motor to move the moveable member toward a desired position, a second control means adapted to stop the first motor by dynamic braking when the moveable member is near the desired position, a third control means adapted to cause the second motor to revolve at a lower rate of speed while continuing the motion of the moveable member toward the desired position, a fourth control means for stopping the second motor, a moveable control element for automatically actuating successively the second, third, and fourth control means, and means for indicating the position of the moveable control element when stopped.

17. In combination, a fixed member, a moveable member, a first motor adapted when energized or when revolved to move the moveable member upon the fixed member, a train of mechanism adapted to revolve the first motor, a second motor adapted to drive the train of mechanism, automatic clutch means in the train of mechanism adapted to disconnect the train when the first motor is energized and to reconnect the train when the first motor is deenergized, a first control means adapted to cause the first motor to move the moveable member toward a desired position, a second control means adapted to stop the first motor by dynamic braking when the moveable member is near the desired position, a third control means adapted to cause the second motor to revolve at a lower rate of speed while continuing the motion of the moveable member toward the desired position, a fourth control means for stopping the second motor, a moveable control element for automatically actuating successively the second, third, and fourth control means, and means for indicating when the fourth control means has functioned.

18. In combination, a fixed member, a moveable member, a first motor adapted when energized or when revolved to move the moveable member upon the fixed member, a train of mechanism adapted to revolve the first motor, a second motor adapted to drive the train of mechanism, automatic clutch means in the train of mechanism adapted to disconnect the train when the first motor is energized and to reconnect the train when the first motor is deenergized, a first control means adapted to cause the first motor to move the moveable member toward a desired position, a second control means adapted to stop the first motor by dynamic braking when the moveable member is near the desired position, a third control means adapted to cause the second motor to revolve at a lower rate of speed while continuing the motion of the moveable member toward the desired position, a fourth control means for stopping the second motor, a moveable control element for automatically actuating successively the second, third, and fourth control means, and measuring means adapted to affect the relative position of the moveable member and the fixed member when the motion of the moveable control element actuates the fourth control means.

JOHN E. DORAN.
JOHN M. WALTER.
FORREST E. CARDULLO.